United States Patent [19]

Behie et al.

[11] 4,439,412
[45] Mar. 27, 1984

[54] PROCESS FOR PRODUCING HYDROGEN FROM HYDROGEN SULPHIDE IN A GAS FLUIDIZED BED REACTOR

[76] Inventors: Leo A. Behie, 2532 Chicoutimi Dr.; Dimitrios Berk, 1340 University Dr., Apt. 207; P. Raj Bishnoi, 712 Varsity Estates Pl.; William Y. Svrcek, 4836 Verona Dr., NW., all of Calgary, Alberta, Canada

[21] Appl. No.: 394,105

[22] Filed: Jul. 1, 1982

[30] Foreign Application Priority Data

Jul. 6, 1981 [CA] Canada ................................. 381149

[51] Int. Cl.³ .......................... C01B 17/04; C01B 3/04
[52] U.S. Cl. ............................. 423/573 G; 423/648 R
[58] Field of Search ............ 423/648 R, 561 R, 573 G

[56] References Cited

U.S. PATENT DOCUMENTS

| | | | |
|---|---|---|---|
| 2,984,548 | 5/1961 | Massey | 423/648 R |
| 3,079,223 | 2/1963 | Lewis | 423/561 R |
| 4,002,720 | 1/1977 | Wheelock | 423/230 |
| 4,039,619 | 8/1977 | Steiner | 423/230 |
| 4,251,495 | 2/1981 | Deschamps et al. | 423/230 |
| 4,302,434 | 11/1981 | Hellmer et al. | 423/573 G |

FOREIGN PATENT DOCUMENTS

| | | |
|---|---|---|
| 497747 | 11/1953 | Canada . |
| 632810 | 12/1961 | Canada . |
| 870516 | 5/1971 | Canada . |
| 921228 | 2/1973 | Canada . |
| 1007176 | 3/1977 | Canada . |
| 1025425 | 12/1978 | Canada . |

OTHER PUBLICATIONS

Raymont, "Hydrocarbon Processing", vol. 54, No. 7, pp. 139-142, Jul. 1975.

*Primary Examiner*—Edward J. Meros
*Assistant Examiner*—Steven Capella
*Attorney, Agent, or Firm*—Michael N. Meller

[57] ABSTRACT

The present invention relates to a method of catalytic and thermochemical decomposition of hydrogen sulfide gas. A metal chemical catalyst, preferably comprised particularly of iron and other transition metals is employed in a gas fluidized bed reactor in which a substantially constant temperature is maintained to crack the hydrogen sulfide. The sulfur is bound chemically to the chemical catalyst and the hydrogen is sent to a transportation system for recovery. The chemical catalyst can be regenerated by raising the temperature in the gas fluidized bed.

14 Claims, 4 Drawing Figures

PROCESS FOR PRODUCING HYDROGEN FROM HYDROGEN SULPHIDE IN A GAS FLUIDIZED BED REACTOR

The present invention relates to a method of catalytic and thermochemical decomposition of hydrogen sulfide gas.

Hydrogen sulfide has become abundant because it has now become economically attractive to drill into very deep formations for natural gas. These deep wells sometimes contain large amounts of hydrogen sulfide, with contents being commonly as high as 35% and some deep wells containing as much as 90% or more hydrogen sulfide gas. Because of pollution problems from sulfur dioxide and the toxicity of hydrogen sulfide itself, hydrogen sulfide must be removed from the natural gas before distribution of the natural gas to the consumer. There are many methods for removing hydrogen sulfide from natural gas, such as the conventional amine scrubber which will remove acid gases from sour natural gas. Significant amounts of hydrogen sulfide are also produced during the refining of many crude oils, and the potential supply anticipated from coal gasification, coal desulfurization, and synthetic fuel production from heavy oils is enormous.

In current practice, sulfur is recovered from hydrogen sulfide gas, but the hydrogen is not. Hydrogen gas has long been an important gaseous raw material for the chemical and petrochemical industries. It is a valuable commodity, much of which is currently produced from fossil fuels such as natural gas. Recovery of the hydrogen from hydrogen sulfide gas, if economically feasible, would help conserve fossil fuels.

At present, hydrogen sulfide recovered from natural gas is converted to elemental sulfur and water by the Claus process. In this process, one-third of the hydrogen sulfide is oxidized to sulfur dioxide, which then reacts with the remaining two-thirds via a gas-phase redox reaction to produce elemental sulfur and water:

$$H_2S + 3/2 O_2 = SO_2 + H_2O$$

$$2H_2S + SO_2 = 3S + 2H_2O$$

Although the Claus process is fairly efficient, it has the disadvantage that the potential hydrogen values are lost in the form of water. Moreover, because of more stringent air pollution laws, expensive tail gas clean-up plants are required in order to achieve acceptacle $SO_2$ emission levels.

One prior art method for recovering hydrogen from hydrogen sulfide is the direct thermal decomposition method. In this process, $H_2S$ is heated to a high enough temperature that it begins to decompose by the reaction $H_2S(g) \rightarrow H_2(g) + \frac{1}{2}S_2(g)$. The temperatures required are fairly high for partial decomposition, for example, 14% occurs at 927° C. However, difficulties arise with product yield and high temperature separation of both hydrogen and sulfur vapor from an $H_2S$ stream without excessive recycling and cooling/heating transformation to the gas stream. In principle, $H_2$ can be separated by a permeation membrane or porous filter, however, at very high temperatures these methods are impractical. It should also be noted that direct thermal decomposition of $H_2S$ can be justified only if the price of natural gas and coal is sufficiently high. If this is true, the thermal decomposition of water which is very energy intensive could also become a viable method for producing hydrogen.

Another method of recovering hydrogen from hydrogen sulfide is thermochemical decomposition. There are available several two-step closed-cycle processes that are feasible at moderate temperatures. A typical closed cycle process would be the following:

$$FeS(s) + H_2S(g) \rightarrow FeS_2(s) + H_2(g)$$

$$FeS_2(s) \rightarrow FeS(s) + \tfrac{1}{2}S_2(g)$$

The first step in the process will take place at a temperature below 500° C., while the second step will take place at a temperature below 900° C.

Obtaining hydrogen from the catalytic cracking of hydrogen sulfide is theoretically possible. Unlike the water molecule, the hydrogen sulfide molecule has a high energy and hence can be cracked at the expense of a relatively small amount of energy. Thermal cracking is not economically practical due to the high temperature required to get high conversions.

In North American, natural gas is the basic raw material to produce hydrogen. The process consists essentially of converting a mixture of natural gas and steam to carbon dioxide and hydrogen. The two basic reactions are the reforming reaction and the water-gas shift reaction as follows:

$$CH_4(g) + H_2O(g) \rightarrow CO(g) + 3H_2(g)$$

$$CO(g) + H_2O(g) \rightarrow CO_2(g) + H_2(g)$$

Carbon dioxide is then removed by amine scrubbers to leave pure hydrogen.

The present invention provides for a method of cracking hydrogen sulfide gas at a relatively low temperature. The essential feature of the invention is the use of a gas fluidized bed chemical catalytic reactor where the $H_2S$ reacts to produce $H_2$ gas and elemental sulfur. The sulfur is bound up on the active material in the chemical catalyst. Once the chemical catalyst deactivates, it can be transported pneumatically to a gas fluidized bed regenerator. Hence, one essential aspect of the entire process is the extensive use of gas fluidized bed technology. The other aspect is the chemical catalyst which is used in the reactor. The expression "chemical catalyst" is used to denote a substance which exhibits true catalytic properties but also takes part chemically to produce the desired reaction. In the present case, the chemical catalyst contains a mixture of metals, all of which are catalytic in nature, but some of which react with the result that the desired reaction is enhanced.

The method of cracking hydrogen sulfide gas into hydrogen and sulfur comprises steps of first introducing hydrogen sulfide gas into a gas fluidized bed reactor containing at least one bed of metal chemical catalyst. The reactor is maintained at a substantially constant operating temperature while the hydrogen sulfide gas is introduced. The result is that the sulfur will be bound chemically to the active material in the chemical catalyst, while the hydrogen can be recovered.

Typically, the chemical catalyst used in the reactor is made up of various quantities of cobalt, silicate, iron, alumina, silicon, nickel, vanadium, copper, zinc and sulfur. Although there is no one precise combination of these materials that works, and, in fact, many combinations will give successful results, it has been found that iron is most preferred for the operation of the reactor system.

There are two factors to consider when making up the chemical catalyst. First, there is the catalyst support that gives structural rigidity and porosity. We have made this support mainly of alumina, silicon, and silicate. Secondly, there is the active material which is deposited on the support. Although both the support and the active material are catalytic in nature, it is the active material which ties up the sulfur. In addition, the particle size can be chosen to give a high quality of fluidization. Ways of producing catalysts of given compositions are described in available literature.

The preparation of a catalyst is standard and usually involves the impregnation of the active material on a support. The steps include evacuation of the carrier, contacting the carrier with impregnating solution, removing the excess solution, drying, calcination and activation. One method which can be used to prepare our chemical catalyst is to soak the evacuated alumina/silica particles with iron nitrate solution, drain them to remove the excess solution, and then heat them in an oven to decompose the nitrate to an oxide. The final step is the reduction of the oxide to metallic iron using a reducing agent such as hydrogen and then the sulfidation of the iron with hydrogen sulfide.

It has been found that natural gas, in addition to sometimes containing $H_2S$, also sometimes contains $CO_2$ in substantial quantities. Carbon dioxide is a valuable gas that is used in substantial quantities for miscible flooding in petroleum reservoirs. In the fluid bed reactor $CO_2$ behaves only as a diluent changing the concentration of $H_2S$ in the feed. The exhaust gases from the output of the reactor are $H_2$ and $CO_2$, which can then be separated by conventional methods and sent to separate transportation systems.

Figure 1:
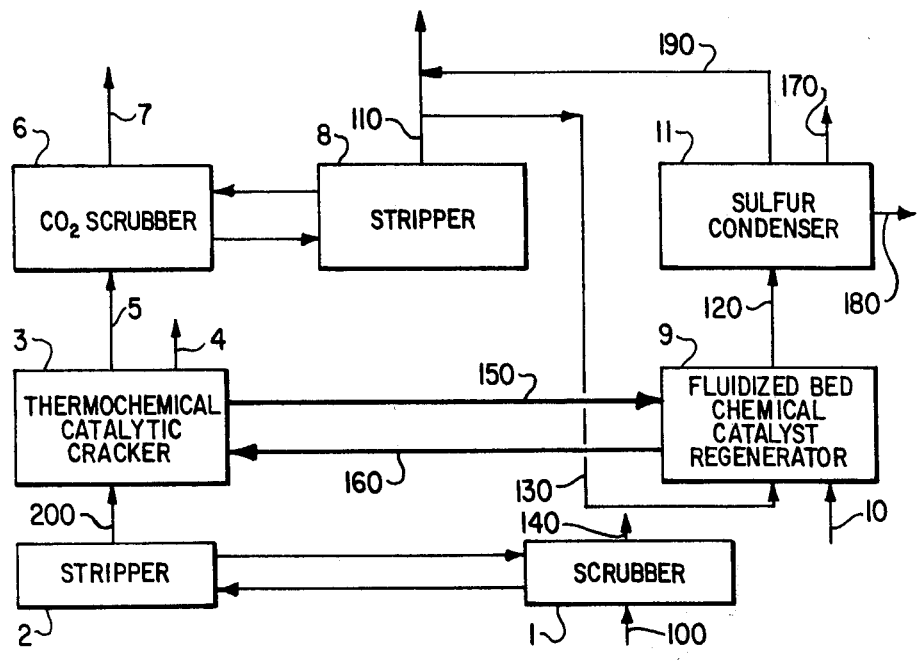
FIG. 1 is a flow diagram in block form for a plant producing hydrogen, carbon dioxide, and sulfur from sour natural gas.

FIG. 1 shows one possible application of the method of the present invention. As such, the process would compete directly with the presently used Claus process in which hydrogen sulfide is reacted to give water and elemental sulfur in fixed bed reactors. Sour gas containing essentially methane, hydrogen sulfide, and carbon dioxide is input at 100 through a conventional amine gas scrubber 1 or other scrubber to remove the acid gases. Methane is removed at 140. After stripping the acid gases from the amine solution in a steam stripper 2, the $H_2S$ and $CO_2$ gases are passed via conduit 200 through a gas fluidized bed of chemical catalyst 3 that cracks the $H_2S$ to $H_2$ gas and sulfur at a temperature in the 350° C. to 550° C. range. The temperature must be kept substantially constant while the reaction is taking place. The sulfur will be bound chemically to the chemical catalyst.

Since the reaction in the thermochemical catalytic cracker 3 is exothermic, heat is generated and can be removed by placing steam tubes in the fluid bed and product steam 4 can exit. Other methods are possible. The exhaust $H_2/CO_2$ gas 5 from the reactor is cooled in a waste-heat boiler (not shown) before passing to another amine scrubber 6 where $CO_2$ is removed. Pure $H_2$ gas comes off the top of the scrubber 7 and pure $CO_2$ is stripped from the amine solution in the amine regeneration 8 and recovered at 110. Both these gases are then sent to a transportation system.

Since the chemical catalyst from the fluid bed cracker picks up sulfur, it can be transferred pneumatically through conduit 150 to a fluid bed regenerator 9 operated at an elevated temperature. Here the sulfur is released as a gas at 120 together with $CO_2$. In order to maintain the fluidization quality in the chemical catalyst regenerator, a slip-stream of $CO_2$ gas 130 may be used to carry the sulfur from the reactor. Because the reaction is endothermic, indirect heat 10 must be added by the burning of fuel. The regenerated catalyst is transferred pneumatically back to the thermochemical catalytic cracker 3 via conduit 160. Following the chemical catalyst regenerator/reactor 9, the $CO_2/S$ gases are passed through a sulfur condensor 11 where additional steam is raised and removed at 170 and sulfur removed at 180. $CO_2$ is also removed at 190 and sent into the transportation system. In addition to the natural gas that is initially separated there are three other products from the plant including sulfur, carbon dioxide, and hydrogen.

Figure 2:
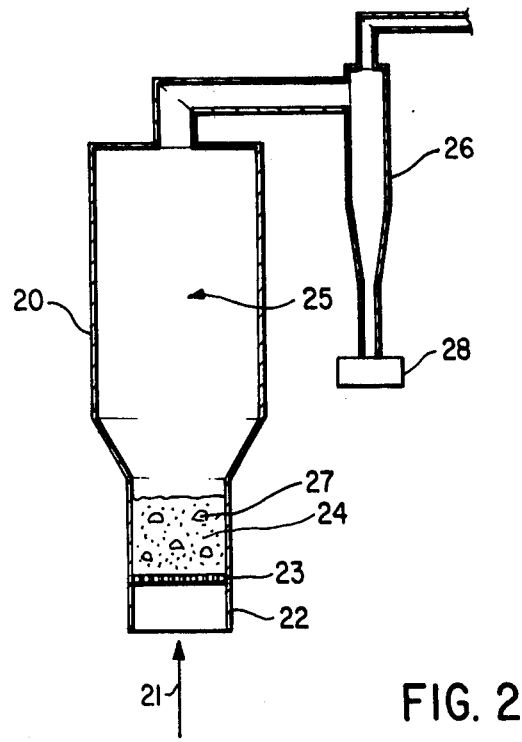
FIG. 2 is a schematic diagram of a bench scale fluidized bed reactor.

FIG. 2 is a schematic diagram of a bench scale fluid bed reactor 20 having a diameter of 10 cm. Inert argon gas is mixed with hydrogen sulfide gas, and the resultant mixture is fed via input 21 into the reactor 20. The argon acts as a diluent only and does not participate in the reaction. The global reaction rate in the fluid bed reactor 20 may depend strongly on the concentration of the reactant hydrogen sulfide. The introduction of inert argon is a means of adjusting the concentration in a laboratory situation. Other inert gases such as neon, krypton, xenon, or helium may work just as well to provide the diluent effect, but may also introduce buoyancy problems because of their different densities. Argon has a density quite close to that of hydrogen sulfide, and is preferred.

The reactant gas enters a standard windbox 22 and then passes through a standard gas distributor or grid 23. This ensures uniform distribution of the reactant gas into the fluid bed by maintaining a relatively large pressure drop across the distributor. The inlet gas then passes into the fluidized bed 24 where the hydrogen sulfide reacts. Typically, gas bubbles 27 are present during the reaction. In the fluid bed 24, the sulfur is tied up on the chemical catalyst and the $H_2/H_2S$ gas produced flows up through the bed into the disengaging section 25, and then into a cyclone separator 26 where any entrained solids are removed. The cyclone separator 26 contains a particle collector 28 and an outlet 29. The fluid bed temperature is kept constant in the range 350° C. to 550° C. An advantage of using fluid bed reactors is that the temperature throughout the bed would be substantially uniform. The temperature uniformity in the reactor is a very key factor in the operation since we have discovered that temperature variations about the desired operating temperature adversely affect the reaction causing the conversion to drop significantly.

Figure 3:
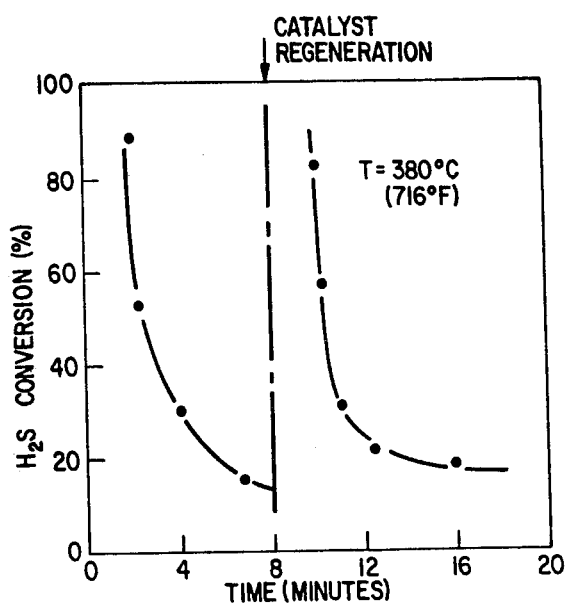
FIG. 3 is a graph showing conversion of hydrogen sulfide in the gas fluidized bed reactor.

FIG. 3 is a graph showing the conversion of hydrogen sulfide in the gas fluidized bed reactor of FIG. 2. The temperature of the reactor was maintained at a constant 380° C. The chemical catalyst in this case was made up of a substantial amount of iron. The important observation is that for the first four minutes, the average conversion of hydrogen sulfide is about 60 to 65 percent. At a time of 8 minutes, the reactor was operated in the regenerator mode by stopping the flow of reactant gas and raising the temperature. To regenerate the chemical catalyst, the reactant gas was switched off and the reactor temperature raised to the range of 600° C. to 950° C. After the regeneration of the chemical catalyst, the temperature of the bed was reduced again to 380° C. and the reaction continued. The results of the experiment show that the chemical catalyst can be operated in a cyclic fashion and that the single stage average conversion is fairly high. It is important to point out that almost identical results were obtained using carbon dioxide as the diluent. This demonstrates the workability of the process application presented in FIG. 1.

Figure 4:
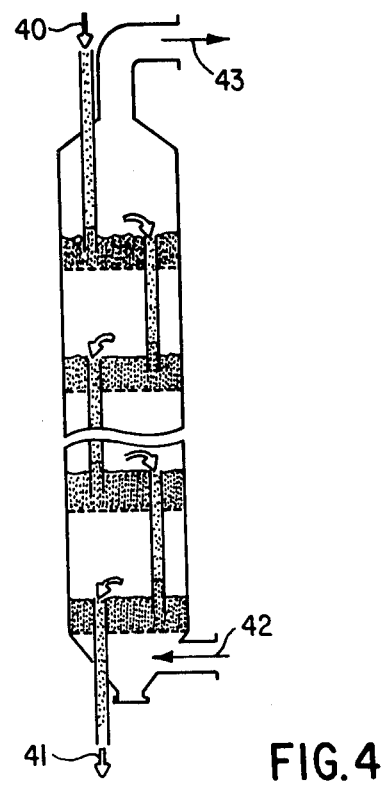
FIG. 4 is a schematic diagram of a staged fluidized bed reactor.

To operate an industrial reactor continuously using the method of the present invention, the problem to be overcome is that the chemical catalyst deactivates over a short period of time. FIG. 4 illustrates how this problem can be handled on an industrial scale. Solids can be made to approach a plugflow condition by having a number of stages in the reactor vessel. FIG. 4 shows a reactor with four stages. Hence if the effective conversion is 50% per stage, then the overall reactor conversion will be 94% for four stages. This fluid bed staging concept has been used widely in industry, for example, the reduction of iron, oxide, and the calcining of limestone. Moreover, the overall mean residence time of the solids in the reactor would be less than twenty minutes. The regenerated chemical catalyst which is most active would come into the initial bed at 40 and flow successively from bed to bed picking up sulfur from the gas as it goes. The solids taken off the last bed at 41 would be fully loaded with sulfur and would be transported pneumatically to the regenerator. The sulfur comes off the chemical catalyst as a vapor in the regenerator, and is then sent to a conventional sulfur condenser. The $H_2S$ gas would enter the staged fluidized bed at 42 and traverse countercurrent to the solids and eventually exit at 43.

To give what is termed a high quality fluidization, fluid bed catalyst particles normally have a distribution with an average diameter of about 80 microns. The particles normally range in size from 40 to about 2500 microns. If the mean diameter of the particles gets too lage (greater than 2500 microns), then large bubbles form in the bed resulting in severe bypassing of reactant gases and lower conversions. Fluidized bed catalyst particles are usually spherical in shape with average diameters in the range of 60 to 120 microns. Also, they are normally made up of highly porous supports resulting in very high surface to weight ratios. It is not unusual for a typical catalyst to have an area of up to 150 square meters per gram.

The embodiments of the invention in which an exclusive property or privilege is claimed are defined as follows:

1. A method of producing hydrogen and sulfur from hydrogen sulfide gas comprising the steps of:
    (a) introducing hydrogen sulfide gas into a gas fluidized bed reactor containing at least one bed of a metal chemical catalyst;
    (b) maintaining said bed at a substantially constant operating temperature between 350° C. and 550° C. for a predetermined time whereby the hydrogen sulfide gas is cracked and the sulfur of said hydrogen sulfide is bound chemically to at least some of the particles of said metal chemical catalyst;
    (c) raising the temperature of the said bed for a predetermined time whereby said metal chemical catalyst is regenerated and said sulfur is exhausted from said reactor as sulfur gas.

2. A method as claimed in claim 1, wherein said bed of metal chemical catalyst in said reactor is raised to between 650° C. and 950° C.

3. A method as claimed in claim 2, wherein said metal chemical catalyst is comprised of cobalt, iron, nickel, copper, vanadium, alumina, silicon, silicate and zinc in percentages varying between 0% and 100%.

4. A method as claimed in claim 3 wherein said metal chemical catalyst is at least 20% iron.

5. A method as claimed in claim 4 wherein said metal chemical catalyst is comprised of particles having mean diameters of less than 2500 microns.

6. A method as claimed in claim 5, wherein there is provided two beds of metal chemical catalyst including a first bed having input means for receiving regenerated metal chemical catalyst and output means for transporting metal chemical catalyst at least partially saturated with sulfur to a second bed, said second bed having input means for receiving said catalyst at least partially saturated with sulfur and output means for transporting regenerated metal chemical catalyst to said first bed, and wherein said cracking step is effected in said first bed, and said regeneration step is effected in said second bed.

7. A method as claimed in claim 5 wherein there is provided a plurality of beds of metal chemical catalyst arranged in series, including a first bed having input means for receiving regenerated metal chemical catalyst and output means for transporting at least partially sulfur saturated metal chemical catalyst to an intermediate bed, at least one intermediate bed having input means for receiving at least partially sulfur saturated metal chemical catalyst from the preceding bed in series and output means for transporting at least partially sulfur saturated metal chemical catalyst to the next bed in series and a last bed having input means for receiving at least partially sulfur saturated metal chemical catalyst from the preceding bed, and output means for transporting regenerated metal chemical catalyst to said first bed, and wherein said hydrogen sulfide gas is introduced into said reactor at the next to last bed and passes through to said first bed, said cracking step being effected in said intermediate beds and said first bed, and said regeneration step being effected in said last bed.

8. A method as claimed in claim 7 wherein said means for transporting said metal chemical catalyst from bed to bed is pneumatic transportation means.

9. A method as claimed in claim 6 wherein said second bed is a fluid bed regenerator.

10. A method as claimed in claim 7 wherein said last bed is a fluid bed regenerator.

11. A method as claimed in claim 9 wherein the gas introduced into said reactor contains, in addition to hydrogen sulfide gas, carbon dioxide, and including the further step of separating said carbon dioxide from the hydrogen gas produced in the cracking of the hydrogen sulfide and passing said carbon dioxide through said fluid bed regenerator whereby said sulfur is carried from said fluid bed regenerator by said carbon dioxide gas.

12. A method as claimed in claim 10 wherein the gas introduced into said reactor contains, in addition to hydrogen sulfide gas, carbon dioxide, and including the further step of separating said carbon dioxide from the hydrogen gas produced in the cracking of the hydrogen sulfide and passing said carbon dioxide through said fluid bed regenerator whereby said sulfur is carried from said fluid bed regenerator by said carbon dioxide gas.

13. A method as claimed in claim 11, wherein the said hydrogen sulfide and carbon dioxide gases are separated from a mixture of natural gas, hydrogen sulfide gas and carbon dioxide gas prior to their introduction into the said reactor.

14. A method as claimed in claim 12, wherein the said hydrogen sulfide and carbon dioxide gases are separated from a mixture of natural gas, hydrogen sulfide gas and carbon dioxide gas prior to their introduction into the said reactor.

* * * * *